United States Patent [11] 3,633,175

[72] Inventor Samuel D. Harper
Framingham Centre, Mass.
[21] Appl. No. 824,914
[22] Filed May 15, 1969
[45] Patented Jan. 4, 1972
[73] Assignee Honeywell Inc.
Minneapolis, Minn.

[54] DEFECT-TOLERANT DIGITAL MEMORY SYSTEM
14 Claims, 3 Drawing Figs.

[52] U.S. Cl. .......... 340/172.5, 235/153
[51] Int. Cl. .......... G06f 11/00
[50] Field of Search .......... 235/157, 153; 340/172.5

[56] References Cited
UNITED STATES PATENTS

| | | | |
|---|---|---|---|
| 3,222,653 | 12/1965 | Rice | 340/172.5 |
| 3,234,521 | 2/1966 | Weisbecker | 340/172.5 |
| 3,245,049 | 4/1966 | Sakalay | 340/172.5 |
| 3,311,887 | 3/1967 | Muroga | 340/172.5 |
| 3,331,058 | 7/1967 | Perkins, Jr. | 340/172.5 |
| 3,350.690 | 10/1967 | Rice | 340/172.5 |
| 3,422,402 | 1/1969 | Sakalay | 340/172.5 |
| 3,432,812 | 3/1969 | Elfant | 340/172.5 |
| 3,434,116 | 3/1969 | Anacker | 340/172.5 |
| 3,541,525 | 11/1970 | Gange | 340/172.5 |

*Primary Examiner*—Gareth D. Shaw
*Assistant Examiner*—Melvin B. Chapnick
*Attorney*—Fred Jacob

ABSTRACT: A defect-tolerant memory system has means for determining when memory operations are addressed to locations that are defective, and for directing these operations to spare memory locations in a main memory. A content addressable memory is provided which has an argument section for storing the addresses of defective locations in the main memory, and a function section for storing a substitute address for each of the defective locations. When the content addressable memory determines that an addressed memory location of the main memory is one whose address is stored in its argument section, it directs the memory operation to a substitute location which has been assigned to that defective main memory location in its function section, thus enabling bypassing of the defective memory location.

INVENTOR
SAMUEL D. HARPER

BY W. Hugo Liepmann

ATTORNEY

INVENTOR
SAMUEL D. HARPER

BY

W. Hugo Liepmann

ATTORNEY

INVENTOR
SAMUEL D. HARPER
BY W. Hugo Liepmann
ATTORNEY

DEFECT-TOLERANT DIGITAL MEMORY SYSTEM

BACKGROUND

This invention relates to data processing, and particularly to a novel digital memory system which can tolerate a number of storage cell defects.

As electronic circuits become smaller and more efficient, the practical problems of their manufacture and repair dictate a high rate of rejection for manufactured components that are not initially perfect. Typically, in the present state of the art of manufacturing integrated circuits and the like, a yield of 15 percent, or 15 initially operable circuits per hundred produced, is considered acceptable. Of course, the yield depends on the complexity of the unit circuit in each final component, because the probability of defects increases with the number of elements in the circuit. Thus, the acceptable yield is, in effect, an upper limit on the unit circuit complexity.

It is desirable to use the integrated circuit process, or other methods of making miniature circuits, for the manufacture of computer memories. However, the high number of defects that currently occur in the manufacture of such circuits having the necessary complexity has made such memories unduly costly and difficult to produce. On the other hand, if imperfect memories could be utilized, the problem would be greatly simplified. Memories with defective storage locations have been utilized by employing so-called "discretionary" wiring. However, that involves individual wiring around bad memory locations, and is hence expensive and time consuming in comparison with the standard wiring of a perfect memory.

Accordingly, one object of this invention is to facilitate the use of memories having defective locations without requiring a large amount of special wiring. Another object of the invention is to provide memory equipment that can operate with undiminished capacity even when memory defects occur during use.

A further object of the invention is to provide defect-tolerant memory equipment capable of remote electrical substitution of spare memory locations for memory locations that are or become defective. It is also an object to provide defect-tolerant semiconductor memory equipment that is economically more favorable than present semiconductor memories.

Other objects of the invention will be obvious and will in part be set forth below.

SUMMARY OF THE INVENTION

The above and other objects of the invention are attained with a novel memory access construction in which a memory that initially has defective storage locations is associated with a set of auxiliary storage locations. Where the memory is fabricated as an integrated circuit on a semiconductor chip, the auxiliary locations can be in the same chip, or in different, and also partly defective, chips. A content addressable memory (CAM) is provided having an argument section with a number of locations, each of which is capable of storing the address of one defective location in the main memory. The content addressable memory also has a function section in which, for each address that can be stored in the argument section, there is a corresponding memory location for storing the address of an auxiliary location. The main and auxiliary memories are associated with an address decoder and driver, and with a conventional memory address register.

During operation, before an address in the memory address register is delivered to the address decoder and driver for operating the main memory, the content addressable memory compares the address with the addresses of defective main memory locations which it stores in its argument section. When the CAM determines that the address currently in the memory address register is the same as an address in the argument section, i.e. is the address of a defective main memory location, the CAM supplies, from its function section, an auxiliary address to the address decoder driver. This directs the information exchange to a spare address location that has been assigned to that defective main memory location. By this arrangement, a considerable number of defective locations in the main memory can exist before it becomes impractical to use the main memory structure.

Another feature of the invention is the provision of means for revising the content addressable memory as failures occur, either in the main memory, in the auxiliary memory, or in the content addressable memory, during operation. The detection of such faulty locations is preferably based on the use of the conventional error detecting equipment, such as the parity check equipment often incorporated in a computer to produce a parity error signal that sets an error flip-flop and lights an indication lamp to indicate that an error has been detected. The contents of the memory address register are normally displayed to the operator, when such an error has been detected, to assist in tracing the error to its source. Apparatus is provided in the system of this invention for revising the contents of the content addressable memory to make provision for such errors traced to faulty memory cells.

BRIEF DESCRIPTION OF DRAWINGS

The manner in which the apparatus of this invention is constructed, and its mode of operation, will best be understood in the light of the following detailed description, together with the accompanying drawings, of various embodiments thereof.

In the drawings.

DESCRIPTION OF ILLUSTRATED EMBODIMENT

Figure 1:
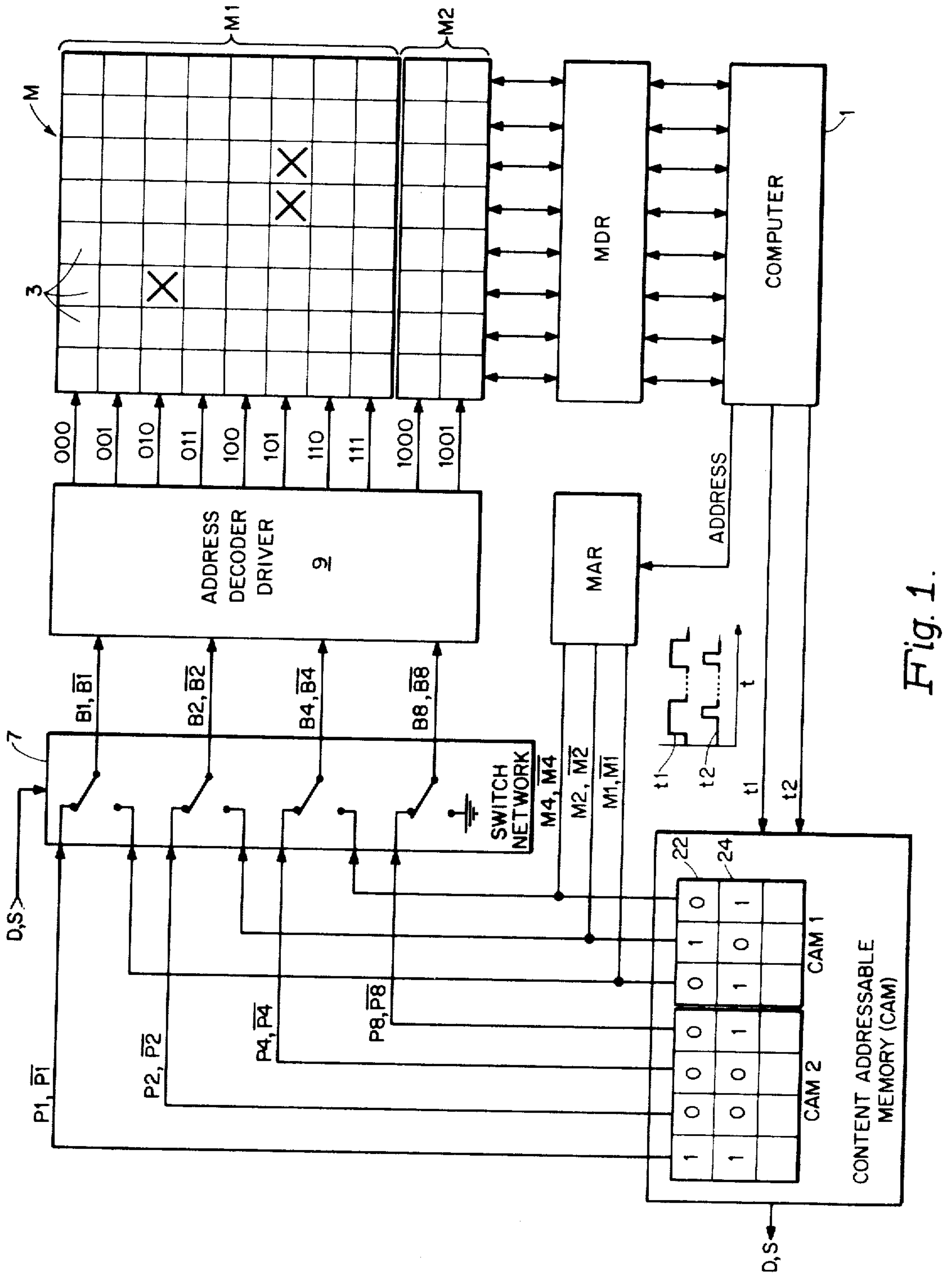
FIG. 1 is a schematic block diagram of a defect-tolerant memory system in accordance with the invention.

Referring first to FIG. 1, the illustrated data processing system incorporating the invention includes a computer schematically illustrated at 1, which may be any conventional digital computer or other information processing apparatus requiring data exchange with a memory. A memory M illustratively has eight eight-bit storage locations forming a main memory M1, and two auxiliary eight-bit storage locations forming an auxiliary memory M2. The number of data cells in each storage location, the number of storage locations, and the total number of locations in the main and auxiliary memories are not critical, and those particular numbers shown are intended merely for simplicity of illustration and to facilitate the understanding of the invention. Further, the main memory M1 and the auxiliary memory M2 can be constructed as physically separate entities, e.g., on separate integrated circuit chips or separate magnetic memory structures, or they can share the same chip or core plane; they are drawn as a single unit for simplicity of illustration.

Individual data cells 3 of the main memory M1 may be defective, as illustrated by the cells marked with an "X." The auxiliary memory locations can be selected from the operable locations of a memory structure containing defective locations. And, should a section of the memory become defective in operation, provision can be made to substitute another operable location.

One approach to the construction of the memory M, for use with a computer having an $m$-bit memory address register is to begin by the construction of a memory having more than $2^m$ locations but having at least $2^m$ usable locations. For example, in the illustrated embodiment, if the original memory had been made to contain 10 locations and two were faulty as shown, that defective memory could be used as a perfect eight-location memory in the manner described below.

Another manner in which the invention can be practiced is to manufacture memories having $2^m$ storage locations, to take advantage of those which are completely serviceable as manufactured. Those memories which turn out to have defective locations can then be used in a manner to be described, either as main memory sections or as auxiliary memory sections depending on the number of defects encountered in testing and on the number of auxiliary locations desired.

Basically, the computer 1 exchanges information with the memory M in the conventional manner by supplying an address to the memory address register MAR and exchanging information with the memory by means of a conventional memory data register (MDR). However, in accordance with the invention, the contents of the memory address register are not entered directly into the address decoder-driver 9 as is conventional, but are first supplied to a content addressable memory (CAM) and to a switch network 7.

In the CAM, the contents of the memory address register are compared with the contents of a CAM argument section CAM 1. This comparison is made in response to a pulse T1 supplied by the computer to the CAM under program control.

If the address stored in the memory address register differs from every address stored in the argument section CAM 1, the CAm produces a signal D. However, if the contents of the memory address register agree with an address stored in the section CAM 1, the Cam produced a signal S. The result of the comparison, in terms of the signal S or D, is produced in response to a pulse T2 supplied by the computer under program control at a time later than the start of T1.

As illustrated at the bottom center of FIG. 1, the pulse T2 can occur while the pulse T1 is still present, or the occurrence of the pulse T1 can be stored in a suitable register until the pulse T2 is produced, whichever is more convenient in the particular apparatus with which the invention is used. In either event, when the pulse T2 is produced, the signal S or D is applied to a switch network 7; the signals S, D appear on the same line in the illustrated embodiment. The switch network 7 controls the application of an address to the address decoder-driver 9. The decoder-driver 9 may be of any conventional construction and arranged in the manner described below to function properly in the system of this invention.

When the signal D is produced, the switch network 7 applies the contents of the memory address register to the address decoder-driver 9 in the conventional manner and selects one of the eight normal storage locations in the memory M1. As illustrated, the addresses of these eight locations are represented by the binary codes 000 through 111 for a three-bit memory address register MAR.

On the other hand, should the address of the defective memory locations 010 or 101 be stored in the memory address register, the CAM will produce the signal S. In addition, the function side CAM 2 of the content addressable memory supplies a substitute address, designated as bits P1, P2, P4, and P8, to the switch network 7.

To simplify FIG. 1, the output signals from the three stages of the memory address register MAR are shown represented by three leads (M1, $\overline{\text{M1}}$; M2, $\overline{\text{M2}}$; and M4, $\overline{\text{M4}}$), although in practice both the signals representing logic ONES for these three stages and their complements are used. Thus, the lowest ordered bit of the address register MAR, shown as a single lead labeled M1, $\overline{\text{M1}}$ actually represents two leads, one of which is at logic ONE when the value of the lowest ordered digit M1 is logic ONE and the other of which is at logic ONE when the value of the lowest ordered digit is logic ZERO. The same notation is used for other similarly labeled leads in FIG. 1. Thus, the substitute address location in the function section CAM 2 of the content addressable memory is shown in FIG. 1 as a four-bit signal appearing with its complement on the lead-pairs labeled P1, $\overline{\text{P1}}$; P2, $\overline{\text{P2}}$; P4, $\overline{\text{P4}}$ and P8, $\overline{\text{P8}}$.

As will appear, it is not essential in every instance that the substitute address contain one more bit then the address of a defective location in the memory section M1. In some instances, it may be desirable to have an *m*-bit substitute address for an *m*-bit address in the MAR. Alternatively, if the integrity of the first secton CAM 1 of the content addressable memory is assured, the function section CAM 2 can be omitted entirely, and the identification signals (discussed below) from the CAM 1 section be processed to cause the decoder-driver to address the appropriate auxiliary location; the switch network 7 can also be omitted in such an implementation of the invention.

When the content addressable memory has determined whether the address stored in the memory address register (MAR) is the same as or different from any addresses stored in the argument section CAM 1, and the signals T2 is produced to gate the signal S or D to the switch network 7, a four-bit address on leads labeled B1, $\overline{\text{B1}}$; B2, $\overline{\text{B2}}$; B4, $\overline{\text{B4}}$; and B8, $\overline{\text{B8}}$ is supplied to the address decoder-driver 9. In particular, the switch network 7 applies the address from the MAR to the decoder-driver 9 when it receives the D signal. Alternatively, it responds to the S signal to apply the auxiliary address from the CAM to the decoder-driver. In the former instance, the B8, $\overline{\text{B8}}$ signals input to the illustrated decoder-driver 9 identify a ZERO so that the decoder-driver addresses a location in the main memory M1. The switch network 7 is illustrated for simplicity as a relay-type switch having single-pole double-throw contacts for each pair of B signals it applies to the decoder-driver 9. The switch is further illustrated as normally applying the P signals output from the content addressable memory to the decoder-driver, and responding to the D control signal to switch in order to apply the M signals from the memory address register, and ZERO-identifying B8, $\overline{\text{B8}}$ signals, to the decoder-driver. In practice, the switch network would for example be a multichannel set of high-speed gate circuits of integrated construction.

Thereafter, depending upon whether the program for the computer 1 has directed a read or a write operation, the contents of the memory data register MDR are either copied into, or changed in accordance with, the contents of the location selected by the address decoder-driver 9.

As a result of the foregoing arrangement, for workable memory locations in the main memory M1, the selected address will be that stored in the memory address register MAR. For these locations in which defective cells have been detected, such as the locations 010 and 101 in FIG. 1, the auxiliary address storage in the function section CAM 2 of the content addressable memory will be selected. In FIG. 1, such auxiliary, substitute, locations are shown at 1000 and 1001 in the auxiliary memory M2.

So far as the computer 1 is concerned, the substitution of the auxiliary address for the requested address makes no difference. The only functional difference in the operation if the system is that there is a small delay to interrogate the CAM before the normal memory addressing procedure is completed. Since the reading and writing times for conventional memories are relatively large compared to the additional times required for gating and stabilization on the CAM and the switch network 7, the additional delay is insignificant for most practical purposes.

An important object of the invention is to facilitate the use of memory structures which upon manufacture are found to contain defective storage locations. However, the presence of initially imperfect storage locations suggests the presence of marginally operable locations which can become defective during the operating life of the memory. In addition, operation in certain environments, as in the presence of particle bombardment and the like, can result in storage cell failure. It is within the scope of the invention is its broader aspects to provide for that contingency by the incorporation in the computer of apparatus for compensating for such failures. That is accomplished by reassigning spare CAM locations for locations in the content addressable memory that become defective, or for assigning new locations in the content addressable memory to substitute auxiliary locations for locations in the main memory that become defective. While various techniques may be employed for this purpose, an effective approach is to use the parity checking apparatus commonly employed in a computer to identify a defective memory location, and to provide apparatus for changing the contents of the content addressable memory to change the memory location assignments so that the newly encountered defective location can be replaced by a usable location.

For example, the computer 1 will normally be associated with a parity or other memory check system that will stop the computer when an error is detected. It is also conventional to provide the memory address register with indicators that are energized when an error is detected to display to the operator the memory address that was effective when the error was detected.

Various known diagnostic arrangements may be made to locate an error either manually or automatically. For example, upon detection of the error the equipment can direct entry of the computer into a program subroutine that would try one or more times to repeat the memory address procedure, and then simply return to the program if the error was not repeated, or to stop when the error indicator ON in the event that repeated entry was unsuccessful. In that manner, parity and other errors due to transients would be ignored, whereas errors due to memory location defects would be singled out for repair by use of auxiliary locations as described herein.

The content addressable memory is illustrated in FIG. 1 with an argument section CAM 1 having an *m*-bit storage location for each auxiliary memory location that can be substituted for a main memory location. The content addressable memory preferably also has additional locations available to substitute for locations in either CAM section that become defective. The assignment of two CAM locations 22 and 24 for replacing the defective main memory locations is indicated in FIG. 1.

The function section CAM 2 of the content addressable memory has a separate location associated with each Cam 1 location, and, as indicated, each CAM 2 location can store the address of a location in the auxiliary memory.

The illustrated function section CAM 2 memory has one more bit in each location than does the CAM 1 section or the memory address register. And where needed, additional bits can be provided in each CAM 2 location.

Alternatively the two sections of the content addressable memory can each have the same number of cells as the memory address register in instances where the accessible range of memory locations need not be a full binary modulus. For instance, where a memory M of $2^{13}$, or 8,192, possible locations is to operate as a perfect 8,000-word memory, the remaining 192 locations will be used to replace defective locations. For this arrangement, the memory address will be 13 bits long, and each section of the content addressable memory can be of this same length.

Figure 2:
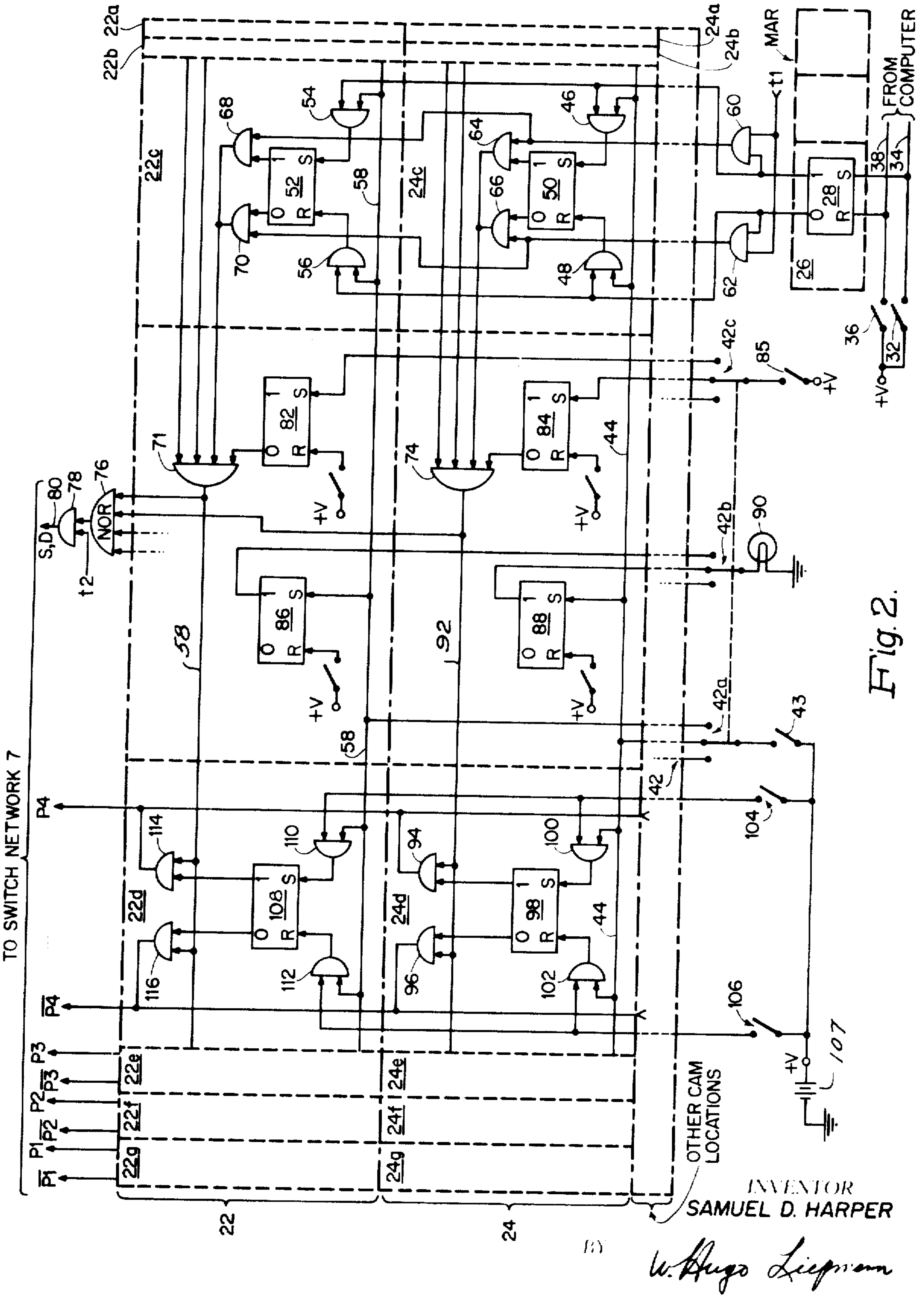
FIG. 2 is a schematic diagram of a content addressable memory for use in the system of FIG. 1.

FIG. 2, which illustrates a construction for the content addressable memory of FIG. 1, shows the upper, first location 22 and the intermediate, second location 24 of the CAM 1 and CAM 2 sections show in FIG. 1. Each CAM 1 section of location 22 has three binary cells 22*a*, 22*b* and 22*c*, and likewise each CAM 1 section of location 24 has cells 24*a*, 24*b* and 24*c*. Similarly, each CAM 2 section of locations 22 and 24 has four cells 22*d*, 22*e*, 22*f*, and 22*g*; and 24*d*, 24*e*, 24*f* and 24*g*, respectively. FIG. 2 shows in detail the circuit of the illustrated leftmost CAM 1 cells 22*c* and 24*c* and of the illustrated rightmost CAM 2 cells 22*d* and 24*d*. These circuits are typical of the remaining cells, and the circuitry between these CAM 1 cells and CAM 2 cells is common to all the cells in one location.

FIG. 2 also shows one stage 26 of the FIG. 1 memory address register and illustrates it as including a flip-flop 28 that is set when it receives an assertion signal either from closure of switch 32 or from the FIG. 1 computer via line 34. Likewise, the MAR flip-flop 28 is reset when it receives an assertion signal either from the closure of a switch 36 or from the computer on line 38.

The memory address register stage 26, typical of the other MAR stages, receives signals on the lines 34 and 38 when the FIG. 1 computer is addressing the main memory M1. Alternatively, the switches 32 and 36 are operated to load the memory address register stage 26 with one bit of an address that is to be stored in CAM 1 cell, i.e., to load the CAM 1 section with the address of a faulty main memory location so that an auxiliary location can replace it.

To read this information present in the memory address stage 26 into the CAM 1 cell 24*c*, a three section distributor 42 is set to the position shown so that a distributor section 42*a* applies an enabling voltage +V from switch 43 to a bus 44 that connects with all cells in the CAM location 24. The enabling voltage +V, is supplied by a power source such as a battery 107 connected at its other end to circuit ground. In cell 24*c* this voltage on the bus 44 enables AND-gates 46 and 48 to cause whichever one receives, at is other input, an assertion signal from the MAR flip-flop 28 to switch a flip-flop 50 to the same state as the MAR flip-flop.

This illustrated arrangement and operation for loading the CAM 1 section with the address of a memory location that is to be replaced with an auxiliary memory location is typical for the other cells and the other locations of the CAM 1 section. Accordingly, the CAM 1 cell 22*c* likewise has a flip-flop 52 having input AND-gates 54 and 56, each of which is connected to receive enabling voltage from a bus 58 and is connected with the MAR flip-flop 28 in the same manner as the cell 24*c* gates 46 and 48.

After the computer loads an address into the memory address register to address a location in the main memory of FIG. 1, the computer produces the timing signal *t*1 as noted above. As shown in the lower right corner of FIG. 2, this signal enables AND-gates 60 and 62 in the CAM 1 section. Whichever gate is receiving an assertion signal from the memory address register flip-flop 28 then interrogates the CAM 1 cells 22*c* and 24*c* to determine which cells are storing the same bit that is in the MAR flip-flop 28. In particular, when the flip-flop 28 is set, i.e., stores a ONE, the *t*1 signal actuates the gate 60 to enable AND-gate 64 in cell 24*c* and to enable AND-gate 68 in cell 22*c*. Assuming further that the cell 22*c* flip-flop 52 is reset, i.e., stores a ZERO, the other input to AND-gate 68 is a negation signal and hence this gate does not produce an output signal. As a result, the cell 22*c* applies a negation signal to an AND-gate 71. Hence this AND gate continues to apply a negation signal to its output terminal. Note that when flip-flop 28 is reset, gate 62 is enabled by the *t*1 signal to enable AND-gates 66 and 70.

However, assuming cell 24*c* flip-flop 50 is set, it applies an assertion signal to the other input of gate 64 so that when the *t*1 signal is present this AND gate is actuated to apply an assertion signal to a further AND-gate 74.

The AND-gate 74 also receives an input signal form the other CAM 1 section cells 24*b* and 24*a*. Accordingly, AND-gate 74 produces an assertion output signal only when the three CAM 1 cells 24*a*, 24*b* and 24*c* store the same address that is in the memory address register, i.e., when there is a match between the contents of the location 24 CAM 1 section and the memory address register contents.

With further reference to FIG. 2, this assertive signal from AND-gate 74 actuates a NOR-gate 76 to enable an AND-gate 78. The other input signal to the AND-gate 78 is the timing signal *t*2, and hence when the timing signal *t*2 appears the AND-gate 78 develops the S signal on its output line 80 that, as discussed above with reference to FIG. 1, operates the switch network 7 to apply to the address decoder-driver 9 the address which the switch network receives from the CAM 2 section of the content addressable memory.

The content addressable memory also has, as shown in FIG. 2, a "defective-location" flip-flop 82 in location 22 which, when in the ONE state, disables the AND-gate 71 in that location. A flip-flop 84 is similarly connected in location 24 with the AND-circuit 74. Each defective-location flip-flop is set by a switch 85 connected with the commutator of the distributor section 42*c*, and can be reset, illustratively with a switch connected to receive the enabling voltage, +V, as shown. These flip-flops are provided to prevent a defective CAM location from producing a response to the signals *t*1 and *t*2. For example, assume that it is determined that CAM location 22 is defective, e.g. either in the CAM 1 section or in the CAM 2 section. The operator in essence removes this location from the system by setting the distributor 42 to connect the switch 85 with the set input of flip-flop 82. The operator then depresses the switch 85, thereby setting flip-flop 82 so that it no longer applies an assertion signal to the gate 71, i.e., it then disables the gate 71. When disabled in this manner, the AND-gate 71 does not produce an assertive output signal even when all the CAM 1 cells 22*a*, 22*b*, and 22*c* match the contents of the memory address register.

Each CAM location 22, 24 has a further "busy" flip-flop 86, 88 respectively that is set from the associated bus 58, 44 when the CAM 1 section in that location is loaded with a memory address. The set flip-flop then communicates through distributor section 42*b* with a lamp 90 coupled at one end to circuit ground, to signal the operator that CAM location is busy and should not be loaded with another memory address. That is, when, for example, the CAM 1 section of location 24 is loaded with the address of a defective main memory location, the enabling signal applied for this operation to the bus 44 by way of distributor section 42*a* automatically sets flip-flop 88. Thereafter, in the event the operator again sets the distributor to select the location 24, the output of flip-flop 88 is connected through the distributor section 42*b* to illuminate lamp 90, thereby indicating to the operator that the location 24 already contains a memory address. The lamp 90 is illustrative of whatever alarm device is desired. Further, automatic interlock circuits can be provided with conventional skills to prevent the operator from inadvertently loading a new address into the location 24.

The distributor 42 thus serves to select any location in the content addressable memory. The secton 42*a* energizes the bus 44, 58 in the selected location for entering an address into the CAM 1 section of the location and, as discussed below, also for entering an address in the CAM 2 section. The distributor section 42*b* operates the lamp 90 when the selected location is "busy," and the section 42*c* is used to disable any selected location.

With further reference to FIG. 2, when AND-gate 74 receives all assertive input signals, indicating a match between the contents of the cells 24*a*, 24*b*, 24 *c* and the memory address register and further indicating that flip-flop 84 is in the reset, ZERO state, in addition to operating the NOR-gate 76 discussed above, the AND-gate 74 applies an identification signal in the form of an assertive level to a bus 92 that connects to all the cells in the CAM 2 section of location 24. In cell 24*d*, this signal on bus 92 enables two AND-gates 94 and 96. When thus enabled, one gate of AND-gates 94 and 96 develops an assertive output signal and the other a negative output signal, according to the state of the flip-flop 98 to which the other input of each AND gate is connected. The output signals from the gates 94 and 96 are the P4 and $\overline{P4}$ bits of the substitute address which the content addressable memory produces.

Substitute address information is written into the flip-flop 98 in cell 24*d* by way of gates 100 and 102; one input to each of these gates is from the bus 44 that is selected with distributor section 42*a*. The other input to gate 100 is developed with a switch 104 when a ONE is to be stored in the flip-flop 98, whereas the gate 102 receives a signal from switch 106 when the flip-flop is to be reset.

The cell 22*d* in the CAM 2 section of location 22 is constructed identical to the cell 24*d* with a flip-flop 108 having input gates 110 and 112 that receive signals from the bus 58 and from the switches 104 and 106. The state of the flip-flop 108 is gated to the auxiliary address lines P4 and $\overline{P4}$ by way of gates 114 and 116.

The operation of the foregoing defect-tolerant memory system will be apparent to those skilled in the art from the above description. Briefly, however, assume that a main memory M1, FIG. 1, has been found to contain defects in the locations 010 and 101, as shown in FIG. 1. An auxiliary memory section M2 having at least two locations is provided. Having determined that these main memory locations are defective, the memory address register is loaded, illustratively by switches such as the FIG. 2 switches 32 and 36 or more commonly under program control by the computer, with the address 010.

To load this address into CAM 1 section of the content addressable memory, the distributor 42 is set to select location 22 and the switch 43 connected with the distributor section 42*a* is depressed, thereby loading the CAM location cells 22*a*, 22*b* and 22*c* with the memory address 010 from the memory address register.

Further, to assign the auxiliary memory location 1000 to replace this defective memory location 010, the CAM 2 section of location 22 is loaded with this auxiliary memory address 1000. This is done with the distributor 42 set to select location 22 and by actuating switches, such as the switches 104 and 106, or by program control with the computer.

In the event that the CAM 1 locations 22 were determined to be defective, the flip-flop 82 therein would be set, illustratively by way of the switch 85 and the distributor section 42*c*. Thereafter, the defective main memory location 010 and the replacement auxiliary location 1000 would be loaded, respectively, into the CAM location 24 sections CAM 1 and CAM 2.

In like manner, the address of each other defective main memory location is loaded into a different operable CAM 1 section, and the auxiliary memory location that is to replace that defective main memory location is loaded into the associated CAM 2 section.

When all the defective memory locations are "replaced" in this manner, the computer operates in normal fashion, making access to memory locations in the conventional manner. However, in each memory accessing cycle, after sending the memory address to the memory address register, the computer interrogates the content addressable memory, in the manner illustrated above by use of the timing signals *t*1 and *t*2. As a result, the address decoder-driver 9 automatically receives the specified main memory address when that location is operable, and automatically receives the address of a substitute, auxiliary memory location when the specified main memory location is defective.

Alternative to the foregoing, the memory system of FIG. 1 can be operated to access the memory location addressed by the memory address register (MAR) on every memory cycle, without regard to whether the content addressable memory (CAM) reports that the addressed location is defective. However, when the CAM reports that the addressed location is defective, immediately after that normal memory access operation, the CAM signals the computer to repeat the memory access operation using a substitute location, for which the CAM provides the address.

With this manner of operation, the memory system, and the balance of the data processing system connected with it, operate at maximum speed for all normal memory accessing operations. Only those memory operations involving defective locations are delayed; the delay being that the memory operation is repeated. Thus, where the memory operation is a write operation, the information in the memory data register (MDR) that was written into the defective location during the normal, first memory accessing operation is retained in the memory data register. Upon the repeat of the memory operation, this information is written into the auxiliary location assigned to replace the particular defective location originally addressed. The machine then proceeds to its next operation.

On the other hand, where the memory operation is a read operation, the information read from the memory, i.e., from the addressed location which in fact is defective, and stored in the memory data register after the first memory operation, is not transferred out of the memory data register. Instead, the CAM signal identifying the addressed location as being defective causes a repeat of the read operation, but with access being made to the auxiliary substitute memory location, and the contents thereof are read into the memory data register in place of its prior contents.

A specific illustration of this alternate operation of the memory system in FIG. 1 proceeds with the computer 1 transferring to the memory address register the address of the main memory location which the computer desires to access. The address register applies this address information directly to the switch network 7, which is in a normal state (opposite to that shown) such that it applies the address from the register directly to the address decoder-driver 9. Accordingly, the decoder-driver 9 receives the address output from the computer 1 in the same fashion as for a conventional memory system. Similarly, the computer proceeds with the memory accessing cycle in the normal sequence and either reads into the memory data register the information stored in the addressed location, or alternatively writes the information from the memory data register into the addressed memory location. Thus, the system performs the memory accessing operation in the normal manner.

However, simultaneous with the application of the memory address to the switch network 7, the memory address register applies it also to the CAM 1 section of the content addressable memory. In the time while the system is completing the normal memory operation as just described, the CAM compares the address from the memory address register with the contents of the CAM 1 locations and then produces the D or S signal, whichever is appropriate. And where there is a match, the CAM operates the CAM 2 section to apply the appropriate address of a substitute location in the auxiliary memory to the switch network 7.

Upon completion of the normal memory cycle, when the computer detects that the D signal is present from the CAM, it accepts the memory operation just completed as valid, and proceeds on with the program it is processing. On the other hand, when at this juncture the computer 1 detects the S signal, indicating a match between the addressed location and the contents of the CAM 1 section, the computer branches or otherwise detours to repeat the memory accessing operation. For the repeated operation, the switch network 7 is operated to provide the address decoder-driver 9 with the auxiliary address output from the CAM 2 section of the content addressable memory.

Accordingly, for this alternative operating arrangement, the computer develops the $t1$ signal discussed above at the same time that it operates the memory address register to apply the contents thereof to the switch network 7. The computer can produce the $t2$ signal and sample the (D, S) signal, which is applied to the computer, during the performance of the normal memory operation. However, the (D, S) signal should not be applied to the switch network 7 until after the address decoder-driver 9 has no further need to receive address signals from the switch network 7 for the normal memory cycle being performed. Further, this alternative manner of operation in some instances may call for the memory data register to be cleared after a read operation from a defective main memory location. These details of the implementation are considered well within the realm of one skilled in the art.

Figure 3:
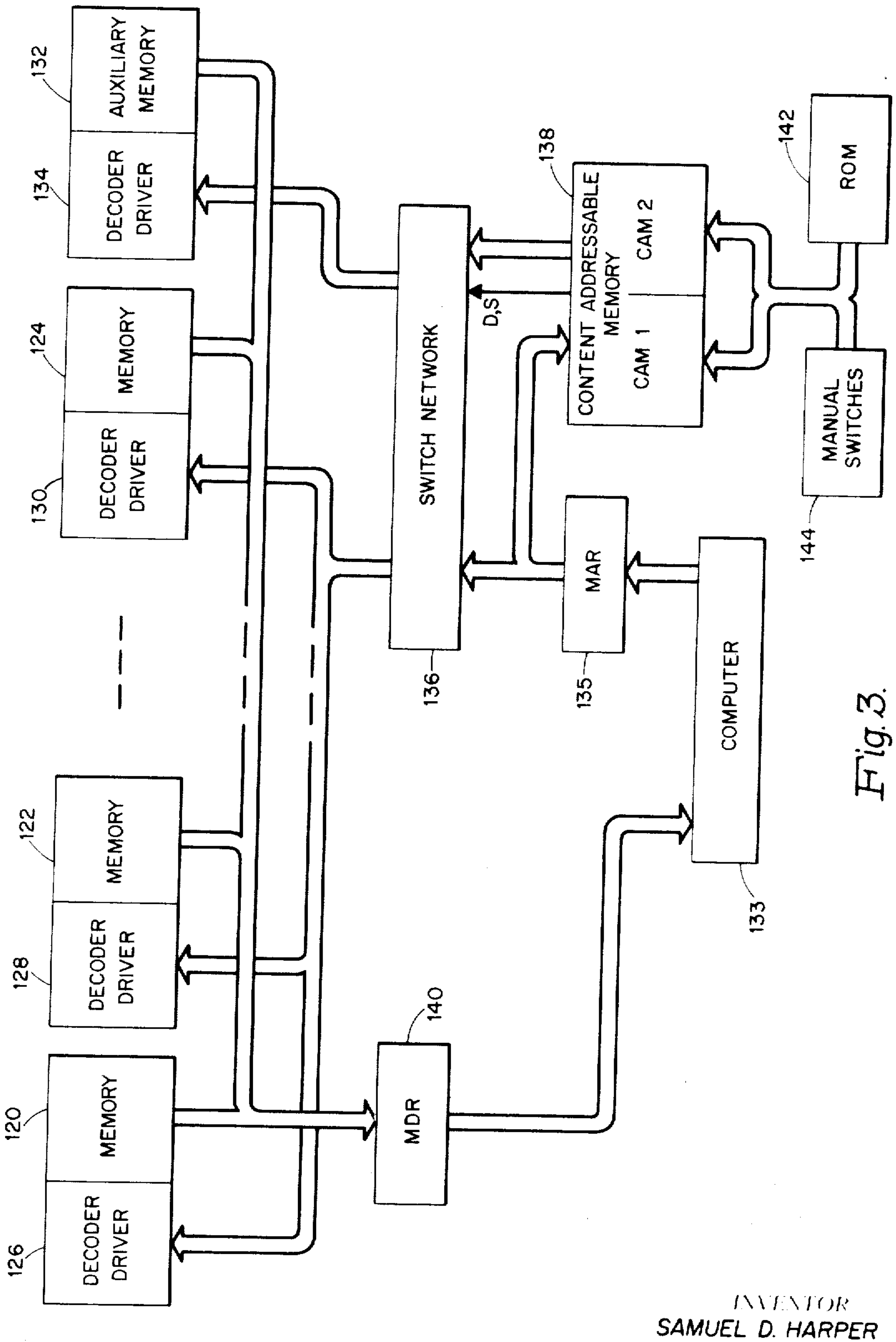
FIG. 3 is a block schematic representation of another arrangement of a defect-tolerant memory system according to the invention.

FIG. 3 shows how the invention can be practiced with several memories 120, 122 and 124 each having separate address decoder and driver 126, 128 and 130, respectively. Another decoder and driver 134 is associated with auxiliary memory 132. As in the system of FIG. 1, in the arrangement of FIG. 3 the computer 133 applies to a memory address register (MAR) 135 the address of a memory location to be operated with, and the memory address register applies this address to a switch network 136 and to the argument section CAM 1 of a content addressable memory 138. When the address applied to it from the memory address register matches the address stored in any location in the CAM 1 section, the content addressable memory applies an S signal to the switch network. In addition, the CAM 2 section which can store the address of a location in the auxiliary memory applies an address of the auxiliary memory 132 to the switch network. Alternatively, when the address in the memory differs from the addresses in the CAM 1 section, the CAM applies the D signal to the switch network.

When it receives the D signal, the switch network applies the address it receives from the memory address register to the decoder-drivers of the memories 120, 122 and 124. Thus, the computer operates in the normal manner with whichever location it addresses in the memories 120, 122, 124 so long as the address of that location differs from the memory addresses stored in the CAM 1 section. For this operation, the switch network 136 is arranged to provide the logic for directing the memory address to the decoder-driver connnected with the memory 120, 122, 124 which contain the addressed location.

However, in the event that the address of the specified memory location matches an address in the CAM 1 section, the content addressable memory applies the S signal and the address of an auxiliary location to the switch network to address a substitute location in the auxiliary memory 132.

The information read from whatever memory location is finally selected is transferred to a memory data register (MDR) 140 for subsequent transfer to the computer.

FIG. 3 is illustrative of the fact that the present invention can be practiced with many varied memory configurations. Yet, with the FIG. 3 arrangement, as in FIG. 1, defective locations in the main memory, in the auxiliary memory, or in the content addressable memory can automatically be replaced with different locations.

The illustrated data handling system can further be arranged to store in the CAM 138 only the address information for a portion of a memory such as a sector, page, wherein a plurality of pages are included in a sector, or other section of the total memory capacity of memories 120, 122, and 124. The CAM contents would be changed each time the system started operating with a different memory section. This may be desirable to allow use of a relatively small CAM, which would be considerably less costly than the CAM otherwise required to service the entire memory capacity simultaneously.

For this operation, as illustrated in FIG. 3, the CAM 138 is arranged to be loaded from a memory 142, illustrated as a read only memory (ROM). This operation usually proceeds under control from the computer 133. In addition, a set of manual switches 144 is also shown for loading the CAM; and, of course, the computer 133 can be connected to load the CAM, for example with addresses it obtains from memory via the memory data register (MDR) 140.

With this arrangement, each time the program with which the computer is operating calls for the accessing of memory locations in a new section of memory, the program will also cause the computer to load the CAM 138 from the ROM 142 with the addresses of the defective locations in that section and with the auxiliary locations to be substituted for these defective locations. The system then operates as described hereinabove with the new memory section, with the CAM substituting auxiliary locations for the defective locations.

This arrangement can be economical because the cost of a ROM or other memory structure for the memory 142 is usually considerably less then the cost of a CAM. Further, computer systems today often are operated on a sectorized basis, in that many successive operations are performed with a single memory section, and then operation moves to another memory section.

It should also be noted that the content addressable memory, and the writing of addresses into the CAM 1 and CAM 2 sections thereof, can take several forms. For example, where the memory M is such that it develops no defects after manufacture the content addressable memory can be hard wired once the operable and inoperable locations have been identified. On the other hand, if changes or additions to the distribution of added memory locations are expected, the content addressable memory locations can be constructed, as illustrated, with flip-flops or other alterable circuits which are set in response to keyboard or similar input devices. Further, in an unattended memory subject to damage, the setting of the flip-flop or like CAM cell can be made an automatic consequence of parity or like errors occurring during memory operation. The detection and identification of such errors, and the circuits for replacing them with locations in an auxiliary memory, can be constructed with conventional techniques known in the art.

The content addressable memory hence serves as two multiword registers, each having associated word locations, and a comparator that compares an applied digital work, i.e., an address, with the words in a first of the registers, i.e., the argument section CAM 1. When the comparator detects no match between the applied word and the stored words, it produces a signal, herein the D signal. However, when it detects a match, the comparator produces an S signal and, further, applies to output terminals the word in the second register location associated with the first register location that stored the matching word.

It will thus be seen that the objects set forth above, among those made apparent from the preceding description, are efficiently attained and, since certain changes may be made in the above constructions without departing from the invention, it is intended that all matter contained in the above description or shown in the accompanying drawings shall be interpreted as illustrative and not interpreted in a limiting sense. It is also to be understood that the following claims are intended to cover all of the generic and specific features of the invention herein described and all statements of the scope of the invention, which, as a matter of language, might be said to fall therebetween.

Having described the invention, what is claimed as new and secured by Letters Patent is:

1. In digital memory apparatus, the combination of

A. a first memory having plural information-storing locations and means for addressing the storing locations thereof, B. a memory address register connected for receiving addresses of storage locations in said first memory, C. a second register for storing the addresses of locations in said first memory which are not to be used, D. an auxiliary memory having storage locations capable of registering the contents of said first memory locations that are not to be used and having means for addressing the storage locations thereof, E. a third register for storing the addresses of storage locations in said auxiliary memory, F. means for generating a first timing signal and a second timing signal, said second timing signal following the initial appearance of said first timing signal, G. comparator means connected with said memory address register and with said second register for comparing address contents thereof in response to said first timing signal and producing a first or a second signal in response to said second timing signal according to whether the contents are the same or different, respectively, H. means controlled by said first signal for supplying the contents of said third register to the addressing means for said auxiliary memory during the appearance of said second timing signal, and I. means controlled by said second signal for supplying the contents of said memory address register to the addressing means for said first memory during the appearance of said second timing signal.

2. The combination as defined in claim 1 in which

A. each location in said third register is associated with a location in said second register, and B. said comparator means further responds to the identity between an address in said memory address register and an address in said second register to actuate a location in said third register associated with the second register location storing the matching address, and C. said means controlled by said first signal supplies the contents of said actuated location in said third register to the addressing means for said auxiliary memory.

3. The combination as defined in claim 2 comprising further register means having plural locations each location of said further register means is associated with a different second register location, and each location of said further register means is adapted to inhibit said generating of said first or second signal when said location of said further register means is in a selected state.

4. A memory system comprising

A. a first memory having plural information-storing locations and means for addressing the locations thereof, B. memory address register means for receiving addresses of storage locations in said first memory, C. a second register having locations for storing the addresses of locations in said first memory which are not to be used, D. an auxiliary memory having storage locations capable of storing the contents of said first memory locations that are not to be used and having means for addressing the locations thereof, E. a third register having locations for storing the addresses of locations in said auxiliary memory, F. switching means connected for operation in a first manner to supply said addressing means for said first memory with a location address responsive to the contents of said memory address register means, and alternatively for operation in a second manner to supply said addressing means for said auxiliary memory with an address responsive to the contents of a location in said third register, and G. comparator means connected for comparing the address contents of said memory address register means with the address contents of said second register locations, and for operating said switching means in said first manner when the contents of one second register location and said memory address register means are different and in said second manner when said contents of one second register location and said memory address register means are the same, and H. forth register means having a plurality of locations each associated with a different second register location, each of said fourth register means locations adapted to inhibit said comparator means from operating said switching means when a location of said fourth register means is in a selected state.

5. Apparatus for substituting auxiliary storage locations for defective storage locations in an addressable memory, said apparatus comprising:

A. an auxiliary memory having addressable storage locations,

B. memory addressing means connected to address said locations in said auxiliary memory, and C. content addressable memory means 1. having an argument section providing a plurality of locations for storing addresses of locations in said addressable memory, 2. having a function section providing a storage location associated with each location in said argument section and for storing the address of a location in said auxiliary memory, and 3. responding to an applied address signal identifying the contents of a location in said argument section to cause an address stored in the corresponding location in said function section to be applied to said memory addressing means, and D. means for inhibiting the utilization of a defective location in said argument section.

6. In a data processing memory system having a set of addressable locations, the combinations of A. register means having locations each of which stores the identification of one location of said set of addressable locations which is not to be used, B. addressable auxiliary locations each of which stores the same amount of information as a location of said set of addressable locations and each of which is associated with one location in said register means, and C. means responsive to the addressing of a first location whose identity is stored in a location of said register means for addressing the auxiliary location associated with that register location in lieu of addressing said first location, and D. further information storing means for storing the identification of each location of said register means which is not to be used and for inhibiting the addressing of said means responsive to the addressing of a first location when it stores the identification of a location of said register means that stores the identification of an addressed first location.

7. A memory system, comprising:

A. a main memory having storage location addressing means and potentially defective storage locations, B. a memory address register, C. a second register comprising a plurality of locations for storing the addresses of defective locations in said main memory, D. an auxiliary memory having storage location addressing means and at least one storage location for each location in said second register for storing the contents of a storage location in said main memory, E. a third register comprising at least one storage location for each location in said second register for storing the addresses of storage locations in said auxiliary memory, F. comparator means connected to said memory address register and to each location in said second register for comparing address contents, G. means controlled by said comparator means for producing a location identification signal when the contents of a location in said second register are the same as the contents of the memory address register, H. means controlled by said comparator means for producing a control signal when the contents of the memory address register are not the same as the contents of any location in said second register, I. means controlled by said control signal for supplying the contents of said memory address register to the addressing means for said main memory, and J. means controlled by said location identification signal for supplying the contents of a different location in said third register for each identification signal to the addressing means for said auxiliary memory, wherein the improvement comprises:

K. signal distributing means settable to a different state for each storage location in said second register, L. first signal generating means for producing a digital signal corresponding to an address in said main memory, M. second signal generating means for producing a digital signal corresponding to an address in said auxiliary memory, and N. means controlled by said first and second signal generating means and said distributing means for loading a different pair of locations in said second register and said third register with the digital signal produced by said first signal generating means and the digital signal produced by said second signal generating means, respectively, in each state of said distributing means.

8. The system of claim 7 further comprising:

A. a one-bit register for each pair of locations in said second and said third registers selected by said distributing means for registering the entry of signals into said pair of locations, and B. means controlled by said distributing means for storing a signal in each one-bit register as the corresponding location pair is loaded.

9. The system of claim 8, further comprising:

A. a second one-bit register for each of said pairs of locations,

B. means for selectively storing signals in said second one-bit register to indicate a defective location, and C. means controlled by each of said second one-bit registers for preventing the loading of the associated location pair when a signal is stored in said second one bit register 10. A content addressable memory comprising:

A. an argument section including a plurality of storage locations, each of said locations including a plurality of bistable means having first and second states, each of said bistable means set in a predetermined one of said first and second states in accordance with a signal loaded therein;

B. means for receiving memory address signals, said signals including a plurality of binary representations proportional to the number of bistable means in each of said locations;

C. first gate means responsive to a first timing signal for comparing each of said binary representations with the states of respective bistable means in each of said plurality of locations;

D. a plurality of second gate means each for producing a control signal when each of the states of said plurality of bistable means in one of said locations compares with the respective binary representations of said memory address signals;

E. a function section including a plurality of storage locations corresponding to the locations in said argument section, each of said locations of said function section including a plurality of storage elements, each of said elements set in a predetermined one of first and second states;

F. third gate means responsive to a produced control signal for transferring to a utilizing device an address represented by the states of elements in a function section location corresponding to the argument section location of said produced control signal; and G. means for inhibiting the producing of at least one of said control signals thereby causing the argument section location corresponding to said inhibited control signal to be unusable.

11. A memory as defined in claim 10 wherein said means for inhibiting includes a second plurality of bistable means corresponding in number to the number of argument section locations, each of said bistable means in said second plurality coupled to a corresponding gate in said plurality of second gate means and set to inhibit said corresponding gate in accordance with those argument section locations which are unusable.

12. A content addressable memory comprising:

A. an argument section including a plurality of storage locations, each of said locations including a plurality of bistable means having first and second states, each of said bistable means set in a predetermined one of said first and second states in accordance with a signal loaded therein;

B. means for receiving memory address signals, said signals including a plurality of binary representations proportional to the number of bistable means in each of said locations;

C. first gates means responsive to a first timing signal for comparing each of said binary representations with the states of respective bistable means in each of said plurality of locations;

D. a plurality of second gate means each for producing a control signal when each of the states of said plurality of bistable means in one of said locations compares with the respective binary representations of said memory address signals;

E. a function section including a plurality of storage locations corresponding to the locations in said argument section, each of said locations of said function including a plurality of storage elements, each of said elements set in a predetermined one of first and second states;

F. third gate means responsive to a produced control signal for transferring to a utilizing device an address represented by the states of elements in a function section location corresponding to the argument section location of said produced control signal; and G. a plurality of means for indicating whether said argument section locations are loaded with signals, said plurality of means for indicating corresponding in number to the number of said argument section locations.

13. A memory as defined in claim 12 further comprising fourth gate means coupled to receive said control signals produced by said second gate means, for generating a first state switching signal in response to the presence of at least one control signal and a second timing signal for generating a second state switching signal in response to the absence of all control signals and the presence of said second timing signal.

14. A memory as as defined in claim 13 further comprising:

A. a main memory including a plurality of good storage locations and some defective storage locations;

B. wherein said argument section location includes the addresses of said defective storage locations;

C. an auxiliary memory including storage locations capable of registering the contents of said defective main memory locations;

D. wherein said function section locations include the addresses of said auxiliary memory storage locations;

E. means for addressing said main memory with said memory address signals when said second state switching signal is generated; and F. means for addressing said main memory with said address represented by the states of said elements in said function section when said first state switching signal is generated.

* * * * *